United States Patent

[11] 3,628,883

[72] Inventor Thorbjorn Hals
 Vestfossen, Norway
[21] Appl. No. 882,565
[22] Filed Dec. 5, 1969
[45] Patented Dec. 21, 1971
[73] Assignee A/S Kongsberg Vapenfabrik
 Kirkegardsvien, Kongsberg, Norway
[32] Priority Dec. 6, 1968
[33] Norway
[31] 4898/68

[54] ELASTIC SEALING CONNECTION
 2 Claims, 2 Drawing Figs.
[52] U.S. Cl. .................................................. 415/204,
 277/26
[51] Int. Cl. .................................................. F01d 25/00

[50] Field of Search .......................................... 415/204,
 206, 185, 186; 277/235, 26, 237

[56] References Cited
 UNITED STATES PATENTS
 2,382,706 8/1945 Gente ........................... 277/235

Primary Examiner—Robert I. Smith
Attorney—Holman & Stern

ABSTRACT: The present specification discloses an elastic sealing connection between an elastic expanding scroll of a radial flow gas turbine and other stationary parts of the turbine, comprising an axially extending, annular, elastic flange which is normally a loose fit in an annular groove and is forced into dual-line contact therewith when the scroll expands during the operation of the turbine.

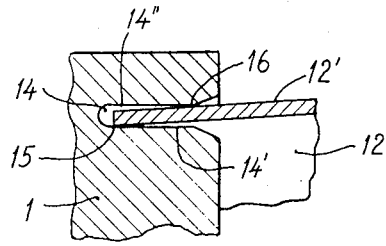
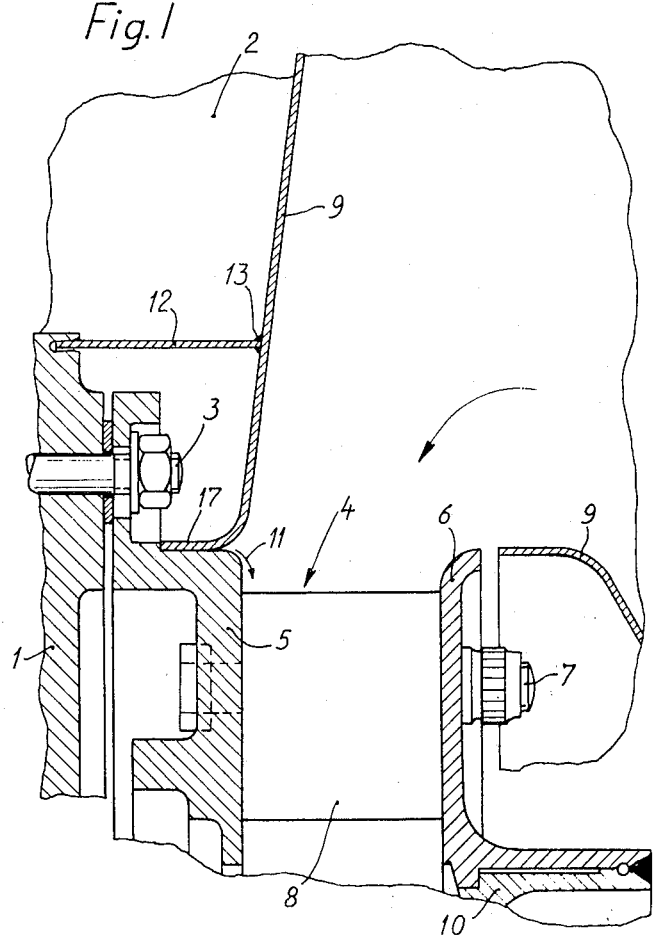

ELASTIC SEALING CONNECTION

BACKGROUND OF THE INVENTION

For passing the hot combustion gases from the combustion chamber of a gas turbine to the turbine rotor of a radial gas turbine there is used a scroll case leading to an annular inlet nozzle unit and designed in accordance with the flow conditions in order to guide the gases into the inlet nozzle. This scroll is strongly heated by the hot gases and thus expands considerably during operation. This expansion leads to problems with respect to the connection between the scroll and the inlet nozzle unit, since the connection must also be elastic in order not to give rise to gas leakages in operation. When the scroll is mounted in the pressure vessel through which the compressed air from the compressor of the gas turbine passes, it may be made of relatively thin material so as to be elastic. Due to the pressure drop through the combustion chamber the pressure of the hot gases in the scroll will be somewhat lower than the pressure of the compressed air surrounding the scroll. If the sealing between the scroll and the inlet nozzle ring is unsatisfactory, compressed air may leak thorough between the scroll and the nozzle ring, which would reduce the output of the turbine and cause a drastic cooling of the surface of the nozzle ring with consequential deformation and stress problems.

SUMMARY OF THE INVENTION

The object of the present invention is to provide an elastic sealing connection of the kind referred to which connection requires only a small room in the axial direction and may be used in radial turbines having a large diameter and a consequential large expansion of the scroll. In large radial turbines, in which the compressor is positioned closely adjacent the turbine rotor so that the room in the axial direction is very limited, the previously known solutions of the sealing problem referred to above are not applicable.

According to the invention the scroll has a substantially axially extending, annular, elastic flange, which is a loose fit in an annular groove in the nozzle ring or a member connected thereto and upon heat expansion of the scroll takes up an inclined position in the groove to provide a line contact between the inner edge of the flange at the free end thereof and the inner surface of the groove and between the outer surface of the flange and an annular edge at the outer end of the outer surface of the groove.

The invention will be described in more detail, reference being had to the accompanying drawing.

In the Drawing:

FIG. 1 is a section of a sectional view through the axis of a radial flow gas turbine, and FIG. 2 is a section of FIG. 1 on a larger scale.

In the drawing 1 designates a diffuser plate for a radial air compressor. The compressed air flows through a chamber 2 and further into a combustion chamber, which is not illustrated. The diffuser plate 1 is connected to an inlet nozzle unit 4 by means of bolts 3, which unit consists of two nozzle rings 5 and 6 connected by bolts 7 and of guide vanes 8.

From the combustion chamber not illustrated the hot combustion gases enter a scroll 9 guiding the gases into the annular nozzle unit 4 and further radially into the turbine.

An annular peripheral edge of the scroll 9 that is axially spaced from the open side facing the nozzle unit 4, is elastically and sealingly clamped to the turbine housing, which is barely visible at 10. This connection is not illustrated, since it may be of a conventional type. However, such conventional elastic and sealing connections are not applicable between the scroll 9 and the nozzle ring 5, especially in radial flow turbines having a large diameter, since the room in the axial direction is too small in the compact design illustrated, in which the air compression impeller and the gas turbine impeller are closely adjacent.

Since the flow direction in the turbine is from the chamber 2 through the combustion chamber and back through the scroll 9, and since there is obviously a certain pressure drop through the combustion chamber, the pressure in the chamber 2 will be somewhat higher than the pressure in the scroll 9. Without a satisfactory sealing, cold air from the chamber 2 may leak into the scroll as illustrated by the arrow 11. This leads to a loss in output and a drastic cooling of the surface of the nozzle ring 5, which fact may lead to deformations and dangerous stresses in the nozzle unit 4. In the turbine illustrated, in which the inlet to the nozzle unit 4 is spaced approximately 360 mm. from the rotor axis, which is a very high figure in a radial flow turbine, the scroll 9 on the point of connection will experience a radial heat expansion of 4 to 5 mm. It is true that the nozzle ring 5 will also expand, but the expansion will not be as great as the expansion of the scroll 9, so that a gap will result, the width of which decides the leakage.

The solution chosen for providing an elastic sealing is best illustrated in FIG. 2. A relatively this metal ring 12 (for instance having a thickness of 1 mm.) is welded to the scroll 9 as illustrated at 13, and spans the gap to be sealed in a position radially outside the abutment between the scroll 9 and the nozzle ring 5. The ring 12 forms an axially extending flange, which at its free end fits into an annular groove 14 in the diffuser plate 1. When the scroll 9 expands, the ring 12 will assume a frustoconical shape, both due to the fact that it is rigidly connected to the scroll 9 and due to the temperature gradient through the ring. As a consequence of this shape the ring will provide a line contact in two positions within the groove 14, viz., between the inner edge 15 of the flange at the free end thereof and the inner surface 14' of the groove as well as between the outer surface 12' of the flange and an edge 16 at the outer end of the surface 14'' of the groove. Thus, according to the invention the expansion of the scroll, which in connection with previously known solutions has given rise to problems with respect to obtaining a sealing connection, is utilized in providing the desired sealing, since the flange 12, as evident from the drawing, is a loose nonsealing fit in the groove 14 when the turbine is cold and only provides the desired sealing as a consequence of the heat expansion of the scroll 9.

The sealing assembly according to the invention entails various advantages. Since the ring 12 may be a loose fit in the groove 14 and the tolerances of the clearance therebetween may be relatively large, the production costs are low. The deeper the groove 14, the larger the clearance permitted. Because of the clearance the mounting is very simple, since the flange 12 may be inserted into the groove 14 by axial displacement, the scroll 9 being guided on the nozzle ring 5 by means of flange 17. Since the flange 12 is thin and is thus relatively elastic, deformation of the parts of the turbine will have little or no influence on the sealing properties.

What I claim is:

1. An elastic sealing connection between an elastic scroll of a gas turbine and a turbine-inlet nozzle ring or a member connected thereto, formed between an annular groove in said nozzle ring or a member connected thereto and an annular axially extending elastic flange engaging at a free end thereof in said groove and extending from said scroll at the other end, said elastic flange being initially a loose fit in said groove but elastically deforming on heat expansion of said scroll to provide a sealing connection between said flange and the groove-carrying member.

2. A gas turbine including an elastic sealing connection as in claim 1.

* * * * *